Figure 1:
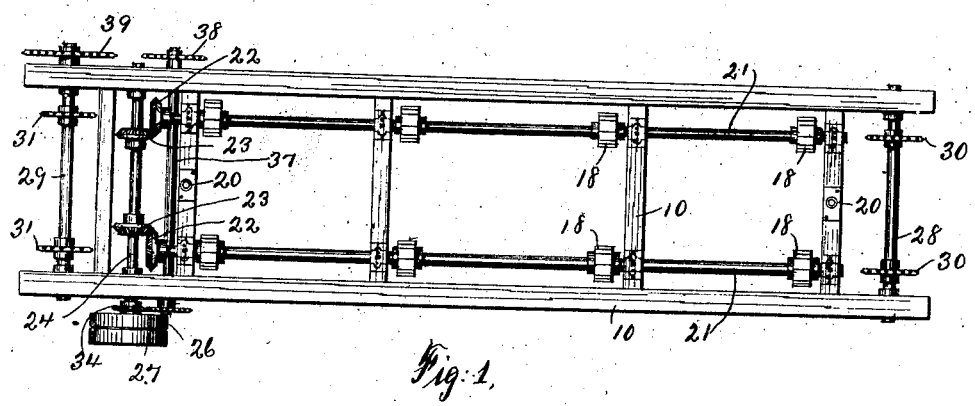

J. KNIGHT.
SHAKER FOR CHOCOLATE AND THE LIKE.
APPLICATION FILED JULY 30, 1912.

1,079,563.

Patented Nov. 25, 1913.

2 SHEETS—SHEET 1.

Witnesses:

John Knight, Inventor.
By his Attorney,

UNITED STATES PATENT OFFICE.

JOHN KNIGHT, OF NEWARK, NEW JERSEY.

SHAKER FOR CHOCOLATE AND THE LIKE.

1,079,563.

Specification of Letters Patent.

Patented Nov. 25, 1913.

Application filed July 30, 1912. Serial No. 712,228.

*To all whom it may concern:*

Be it known that I, JOHN KNIGHT, of the city of Newark, county of Essex, and State of New Jersey, have invented a new and useful Improvement in Shakers for Chocolate and the like, of which the following is a full, clear, and exact description.

My invention relates to improvements in apparatus for shaking liquid, plastic or semi-liquid substances so as to shake the air bubbles from the mass, and leave the material in a dense, smooth condition.

My invention is especially intended to produce a device having a shaking table over which chocolate in molds can be passed, and which will shake the chocolate so as to shake free the air bubbles and leave the chocolate mixture smooth and dense. Obviously the same apparatus can be used for shaking analogous substances for the same reason.

In carrying out my invention, I produce a table which is freely movable in a vertical direction, and is guided in its movement and provides for carrying across the table a series of molds containing the mixture to be shaken. The table is provided with suitable bumpers, and rests upon rotating cams which continuously vibrate it. In connection with the table I use an adjusting frame which has means for adjusting it up and down, and which limits the distance to which the table can drop, thereby regulating the amount of vibration, so that the material can be shaken as hard or as lightly as necessity may require. My invention is also intended to provide a convenient and inexpensive apparatus for this purpose, and one which will enable the material to be conveniently fed across the table so that the expense of shaking will be practically negligible.

Reference is to be had to the accompanying drawings forming a part of this specification, in which similar reference characters indicate corresponding parts in all the views.

Figure 2:
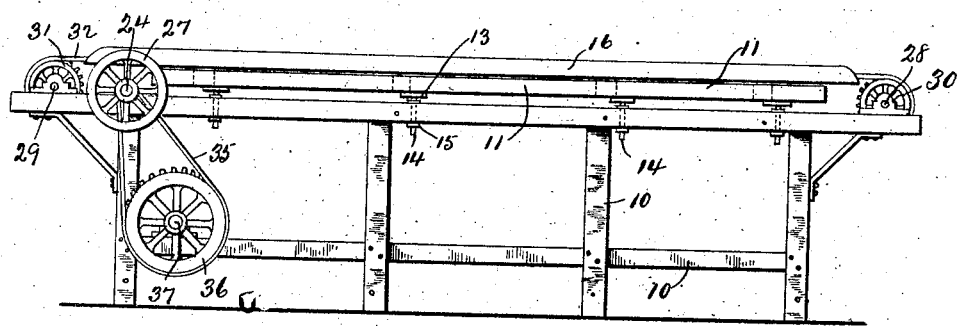
Figure 3:
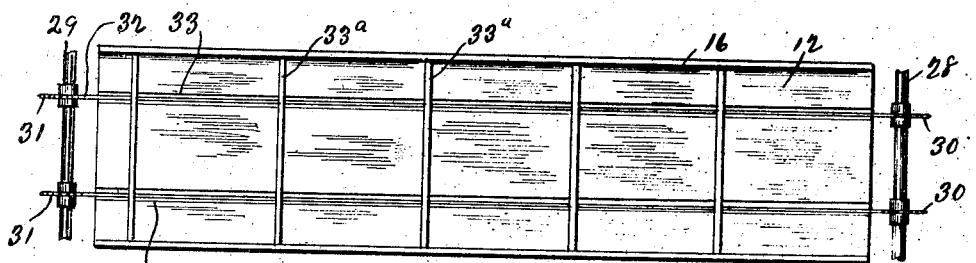
Figure 4:
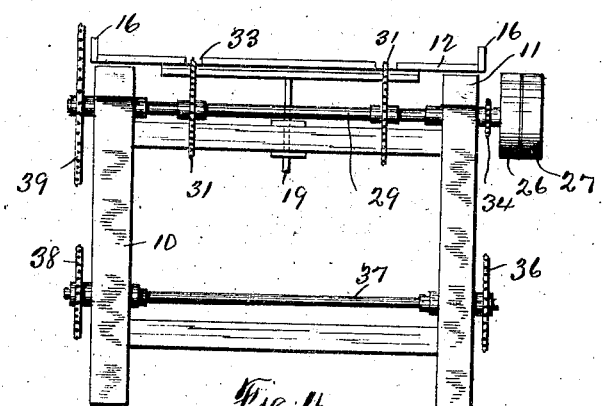
Figure 5:
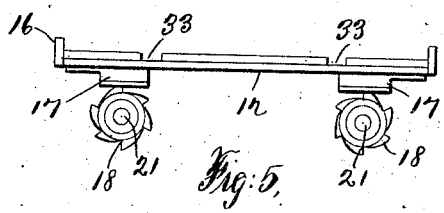
Figure 6:
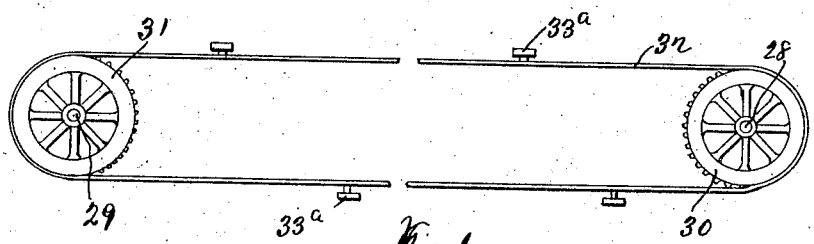
Figure 7:
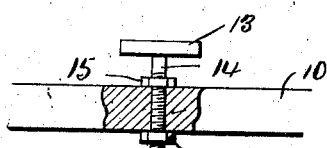

Figure 1 is a plan view of the apparatus with the table and adjusting frame removed. Fig. 2 is a side elevation of the apparatus. Fig. 3 is a plan view of the table and the mold feeding means. Fig. 4 is an end view of the apparatus. Fig. 5 is a detail showing the connection between the table and the shaking cams. Fig. 6 is a diagram in side elevation of the apparatus for moving the molds, and Fig. 7 is a detail view showing the means for adjusting the frame and regulating the amount of vibration.

The apparatus is provided with a suitable frame-work 10 which can be made of timber, or of metal or other material if preferred, and this supports above its flat top an adjusting framework 11 which carries the loose table 12. The frame 11 rests on the broad tops or heads 13 of the bolts 14 which are arranged vertically in the upper member of the frame 10, and which have nuts 15 above and below the frame rail, so that by turning the nuts, the height of the head 13 can be regulated, and by adjusting the several bolts and nuts, the table 11 can be carried at the desired height, and will in this way limit the downward movement of the table 12.

The table 12 is provided with side boards or flanges 16, to prevent the molds from being laterally displaced, and at necessary intervals on the under part and opposite sides of the table are buffers 17 in the form of blocks, which are preferably covered with rawhide, and these buffers rest on the rotating cam wheels 18 which are provided with a series of cam teeth as shown in Fig. 5, so that as the wheels rotate, the table 12 will be thrown upward by the successive teeth and will drop by gravity between the teeth, thus imparting to it a rapid shaking or vibratory movement. In order that the table may be guided accurately in its vertical vibration, it is provided preferably at the ends with depending pins 19 in the nature of king pins, which project through guide holes 20 in the frame 10. The pins are shown clearly in Fig. 4, and the holes in Fig. 1.

The cam wheels 18 can be rotated in any convenient manner, but I have shown them secured to parallel shafts 21 which are supported in suitable boxes in the upper part and opposite sides of the frame 10, and the shafts connect by bevel pinions 22 and 23 with a driving shaft 24 which is provided with a tight and loose pulley 26 and 27, though obviously it can be driven in any convenient way.

To provide for carrying molds of chocolate or other material across the table, the following arrangement can be conveniently used: At the ends of the table are shafts 28 and 29 which carry sprocket wheels 30 and 31 respectively, these being arranged in pairs as shown best in Fig. 1. The alining sprocket wheels 30 and 31 carry belts 32 which are preferably chain belts, and the upper members of these belts run in grooves 33 in the table top. The belts are connected at necessary intervals by cross pieces 33ᵃ which extend across the table top as shown in Fig. 3, and the molds of chocolate or other plastic material are placed on the table top at one end and between the cross pieces or slats 33ᵃ. The movement of the belts 32 and the slats 33ᵃ will therefore carry the molds lengthwise across the table, during which movement they will be rapidly shaken as already described. Obviously the sprocket wheels 30 and 31 can be driven in any convenient manner, but as a convenient means of driving them I have shown the driving shaft 24 provided with a sprocket wheel 34, this connecting by the chain 35 with a sprocket wheel 36 on the shaft 37 which is arranged in the lower part of the frame 10. The shaft 37 has at its opposite end a sprocket wheel 38 from which a belt can be extended to the sprocket wheel 39 on the shaft 29, but as stated, any suitable driving means can be adopted, and I have shown this particular arrangement simply to illustrate an operative device.

From the foregoing description it will be seen that the structure is very simple and efficient, that the adjusting frame can be easily regulated by means of the bolts 14 and nuts 15 so as to limit the amount of vibration of the table 12, and that this table will be rapidly shaken by the cam wheels 18, while the material can slide freely along the table top. It will be noticed further that the table can be easily removed when desired, and that the top is left free and unobstructed so that material can be readily placed on or removed from it.

I claim:—

1. In an apparatus for shaking chocolate, a support, members adjustable in the support, a frame loosely held on the said members, a table movably held by the frame, said table having longitudinally extending grooves in its top, belts mounted to travel in the grooves, and slats attached to and carried by the said belts whereby articles are carried longitudinally of the table, and means for vibrating the table.

2. In an apparatus for shaking chocolate, a support, members adjustable thereon, a frame mounted on the members, a table loosely carried by the frame, said table having grooves in its upper surface and extending longitudinally thereof, means for vibrating the table with relation to the adjustable members, flexible devices traveling in the grooves of the table below the surface thereof, means for causing the travel of said flexible members, and slats attached to the flexible members whereby articles are drawn over the surface of the table thereby.

JOHN KNIGHT.

Witnesses:
WILLIAM F. O'BRIEN,
THOMAS H. ZUCKER.